(12) United States Patent
Brandl

(10) Patent No.: US 9,741,231 B2
(45) Date of Patent: Aug. 22, 2017

(54) TAMPER/DAMAGE DETECTION

(71) Applicant: NXP B.V., Eindhoven (NL)

(72) Inventor: Roland Brandl, Eggersdorf bei Graz (AT)

(73) Assignee: NXP B.V., Eindhoven (NL)

( * ) Notice: Subject to any disclaimer, the term of this patent is extended or adjusted under 35 U.S.C. 154(b) by 138 days.

(21) Appl. No.: 14/203,372

(22) Filed: Mar. 10, 2014

(65) Prior Publication Data

US 2015/0254961 A1   Sep. 10, 2015

(51) Int. Cl.
*G08B 21/18* (2006.01)
*H04B 5/00* (2006.01)
*G06K 19/073* (2006.01)

(52) U.S. Cl.
CPC ..... *G08B 21/185* (2013.01); *G06K 19/07372* (2013.01); *H04B 5/0037* (2013.01)

(58) Field of Classification Search
CPC .......... G08B 21/185; G06K 19/0739; G06K 19/07372; G06K 19/07749; G06K 19/0776; H04B 5/0037; G09F 3/0352
See application file for complete search history.

(56) References Cited

U.S. PATENT DOCUMENTS

| | | | | |
|---|---|---|---|---|
| 5,075,670 A | * | 12/1991 | Bower | G08B 29/046 340/539.1 |
| 6,895,509 B1 | * | 5/2005 | Clark | G06F 21/87 257/922 |
| 8,378,710 B1 | * | 2/2013 | Al-Kadi | G06K 19/07372 326/15 |
| 2005/0275537 A1 | * | 12/2005 | Kerr | G08B 13/186 340/568.2 |
| 2006/0012464 A1 | * | 1/2006 | Nitzan | G06K 19/0702 340/10.1 |
| 2006/0214789 A1 | * | 9/2006 | Posamentier | G06K 19/0716 340/545.6 |
| 2006/0261959 A1 | * | 11/2006 | Worthy | G08B 13/1445 340/572.8 |

(Continued)

OTHER PUBLICATIONS

NXP Product Data Sheet, UCODE G2iL and G2iL+, Rev. 4.3, Nov. 2013.

(Continued)

*Primary Examiner* — Orlando Bousono

(57) ABSTRACT

Various aspects are directed to the detection of tampering, as may be applicable to retail goods and a variety of implementations. As may be consistent with one or more embodiments, an apparatus includes a loop conductor having first and second ends and contiguous conductive material extending in a loop between the ends. A detection circuit detects continuity of the loop conductor and characteristics of power that is provided to the loop conductor and is indicative of validity of the continuity detection. A communication circuit communicates a wireless signal indicative of the detected electrical characteristics, and an energy circuit powers the loop conductor, detection circuit and communication circuit via received wireless power. Other aspects are further directed to an interrogator that provides the wireless power and evaluates the wireless signal to detect tampering with the conductive loop and validity thereof.

20 Claims, 4 Drawing Sheets

(56) References Cited

U.S. PATENT DOCUMENTS

| | | | | |
|---|---|---|---|---|
| 2007/0008121 A1* | 1/2007 | Hart | .................... | G06K 19/0739 |
| | | | | 340/540 |
| 2007/0029384 A1* | 2/2007 | Atherton | .............. | G06K 19/073 |
| | | | | 235/435 |
| 2008/0001741 A1* | 1/2008 | Cobianu | ............. | B60R 25/1004 |
| | | | | 340/568.2 |
| 2008/0024322 A1 | 1/2008 | Riemschneider et al. | | |
| 2008/0157975 A1* | 7/2008 | White | .................... | B65D 55/02 |
| | | | | 340/572.7 |
| 2009/0237249 A1* | 9/2009 | Bielas | ................ | G06K 19/0739 |
| | | | | 340/572.1 |
| 2009/0302111 A1* | 12/2009 | Woodard | ........... | G08B 13/2408 |
| | | | | 235/449 |
| 2010/0265069 A1* | 10/2010 | Michaels | ............... | G08B 13/08 |
| | | | | 340/572.3 |
| 2011/0043339 A1* | 2/2011 | McGregor | ....... | G06K 19/07372 |
| | | | | 340/10.4 |
| 2011/0193678 A1* | 8/2011 | Hanft | ...................... | E05B 39/00 |
| | | | | 340/3.1 |
| 2011/0193701 A1* | 8/2011 | Hanft | ...................... | E05B 39/00 |
| | | | | 340/568.1 |
| 2012/0056755 A1* | 3/2012 | Hanft | ...................... | H04Q 9/00 |
| | | | | 340/870.07 |
| 2012/0218110 A1* | 8/2012 | Forster | ............. | G06K 19/07372 |
| | | | | 340/572.1 |
| 2012/0229254 A1 | 9/2012 | Nowottnick | | |

OTHER PUBLICATIONS

NXP Product Data Sheet, UCODE G2iM and G2iM+, Rev. 305, Nov. 2013.

* cited by examiner

TAMPER/DAMAGE DETECTION

Aspects of various embodiments are directed to tamper detection, and to tamper detection with verification.

Wireless communications are used for a variety of applications, and continue to increase in popularity. In many applications, power is transmitted wirelessly to power remote circuits that harvest and use the wireless power to generate a communication response. Many such approaches are used in a variety of environments, such as to identify a type of product via a tag (e.g., radio frequency identification, or RFID), or to power remote circuits that are not otherwise connected to a power source. Other approaches involve wireless energy transfer to charge batteries on a remote device, which may or may not involve data communication.

A challenge to certain wireless communications involving wireless power relates to the amount of power that is transferred. For instance, where a distance between a base station and a wireless transponder is inconsistent, wireless power transferred for operating the transponder may vary. In addition, other environmental changes, such as the presence of metal structures can affect power transfer. Further, different types of transponders may react differently to provided power.

These and other matters have presented challenges to wireless communications with wireless power, for a variety of applications.

Various example embodiments are directed to tamper-detection circuits, apparatuses, systems, methods and their implementation.

According to an example embodiment, an apparatus includes a communication circuit that communicates wireless signals, an energy-transfer circuit that powers the apparatus via received wireless power, a tamper-detection circuit and a validity-detection circuit. The tamper-detection circuit includes a loop conductor having first and second ends and contiguous conductive material extending between the ends, and provides a first output indicative of a connectivity characteristic of the loop conductor. The validity-detection circuit provides a second output indicative of a validity condition corresponding to a power characteristic of the loop conductor that impacts the validity of the first output. The communication circuit, tamper-detection circuit and validity-detection circuit operate to transmit the wireless signals by transmitting a signal indicative of the first and second outputs.

Another example embodiment is directed to an apparatus including a loop conductor, a detection circuit, a communication circuit and an energy circuit that receives wireless power and powers the loop conductor, detection circuit and communication circuit via the wireless power. The loop conductor has first and second ends and contiguous conductive material extending between the ends. The detection circuit detects electrical characteristics of the loop conductor that are indicative of both continuity and power in the loop conductor. The detected power characteristics are indicative of a validity of the detected continuity characteristics. The communication circuit is operable with the detection circuit to communicate a wireless signal indicative of the detected electrical characteristics.

Another example embodiment is directed to a method for use with a loop conductor having first and second ends and contiguous conductive material extending between the ends. Electrical characteristics of the loop conductor are detected, with the electrical characteristics being indicative of continuity of the loop conductor and of power provided to the loop conductor. The detected power characteristics are indicative of a validity of the detected continuity characteristics. A wireless signal indicative of the detected electrical characteristics is communicated. Power is provided to the loop conductor and for the detecting and the communicating, via received wireless power.

The above discussion/summary is not intended to describe each embodiment or every implementation of the present disclosure. The figures and detailed description that follow also exemplify various embodiments.

Various example embodiments may be more completely understood in consideration of the following detailed description in connection with the accompanying drawings, in which.

Figure 1:
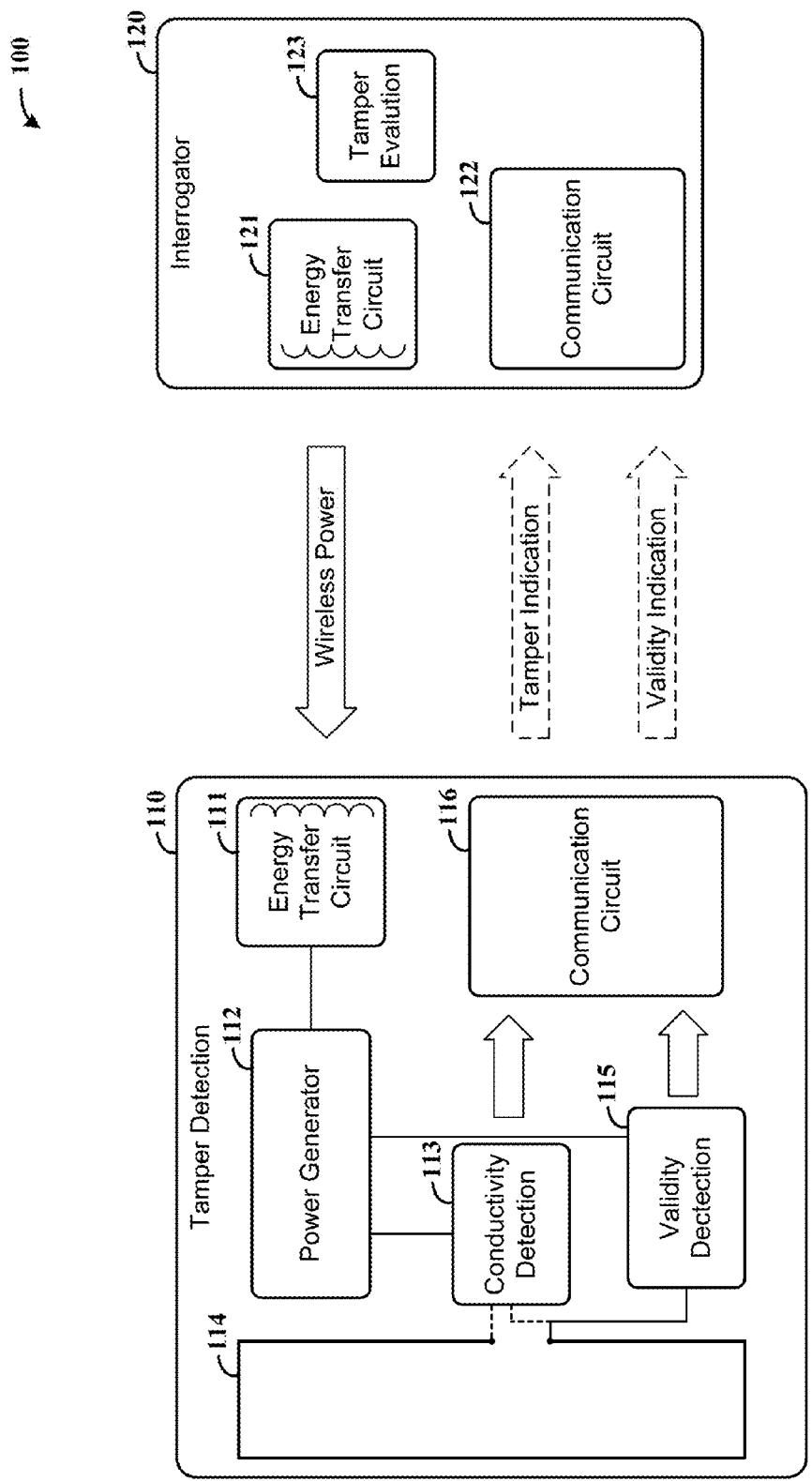
FIG. 1 shows an apparatus for detecting tamper or damage characteristics of a circuit, in accordance with an example embodiment.

While various embodiments discussed herein are amenable to modifications and alternative forms, aspects thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

Aspects of the present disclosure are believed to be applicable to a variety of different types of apparatuses, systems and methods involving wireless communications using inductive power. While not necessarily so limited, various aspects may be appreciated through a discussion of examples using this context.

Various example embodiments are directed to apparatuses, circuits and methods that address challenges, such as those identified in the background above. Certain embodiments are directed to tamper detection or damage detection aspects, and those related to such detection with validation of tamper-indicative characteristics. For example, various embodiments are directed to validation of tamper detection as may relate to power overload conditions. Various aspects are directed to such tamper detection in the context of communications between a base station and a transponder located in a tag-type device that can be attached to an item, such as to clothing and other retail items, for detecting whether the tag has been tampered with.

Power characteristics as related to wireless power transfer (and variations therein) are also detected and used to provide an indication of validity of any indication of tampering. For instance, variations in power that are based upon a distance between the tamper-detection circuit and a wireless power source, or environmental conditions such as the presence of metal structures, are detected and used to provide an indication of validity of a conductivity measurement. Such approaches may, for example, address false readings with regard to conductivity-based tamper detection that involves circuits that are susceptible to influence by such power characteristics with regard to providing an indication of conductivity. Circuits that may be influenced in this regard may include, for example, circuits that measure conductivity or loop type-circuits that are checked for conductivity.

Certain embodiments are directed to detecting radio frequency (RF) power on the tamper-detection circuit, and determining validity of detected conductivity characteristics based on this detected power. For instance, where a certain circuit provides reliable tamper indication below a particular voltage threshold, a validity characteristic can be based upon voltage of the tamper-detection circuit and/or related components being below such a threshold.

The detected power characteristics are used to provide an indication of validity in one of a variety of manners. In some embodiments, a tamper-detection circuit provides respective bits indicative of a conductivity characteristic and of a validity characteristic. If the validity characteristic bit indicates that the conductivity characteristic is invalid and/or untrustworthy, the conductivity characteristic bit is ignored and/or otherwise treated as being invalid or untrustworthy. In a specific embodiment, a first bit indicates the presence of an open/short on a conductive loop, and a second bit indicates a power overload characteristic (e.g., relative to a threshold as discussed herein). For instance, under certain power conditions detection of an open/short status of a conductive loop may not be accurately detectable (it may or may not be accurate), which is indicated via the second bit.

In some implementations, an interrogator generates wireless power used to operate a tamper-detection circuit, and actively responds to the indication that a power overload has occurred by reducing wireless power. After this, the interrogator re-interrogates the tamper circuit at a lower power, repeating the cycle until an accurate conductivity characteristic indication is provided. In other implementations, this approach is used in a calibration scenario in which a distance between the interrogator and an expected position of tamper-protection circuits passing by the interrogator is set in response to the detection. Where a power overload is detected at a certain distance, transferred wireless power can be effectively reduced by increasing that distance.

In accordance with the above and/or other embodiments, a variety of tamper-indicating signals are assessed for validity based upon such a power-based characteristic, which is provided via some indication to an interrogator or other type circuit that detects tampering or other damage to the tag (e.g., and responds by indicating an alarm or tamper condition). Conductivity information such as open/short information and a power characteristic such as an overload indicator is exchanged between an interrogator and tag in a variety of manners. Accordingly, various embodiments may employ one or more of a multitude of manners in which to detect an open/short or other conductivity characteristic, with various accuracies with regard to analyzing an electrical connection (e.g., number of bits used may vary), with various accuracies in detecting power conditions. Sufficient information is generated on the tamper-detection circuit and exchanged with a remote interrogator to make it possible to draw conclusions about how power characteristics might have influenced the detection of tamper-based or damage-based alterations in circuit conductivity characteristics.

In accordance with another embodiment, a tamper-protection circuit includes a conductive loop that provides an indication of tampering when continuity of the loop is altered or otherwise compromised, and power characteristics are detected and used to provide an indication of validity of the tampering. For instance, when a conductive loop is placed within a tag that is fastened to a product or part of a container, the conductive loop can be arranged such that removing the tag by tearing or removing a container lid will also break continuity of the conductive loop. Such a conductive loop may, for example, be implemented with RFID tags that provide additional functionality. In some embodiments, the tamper-protection circuit detects tampering by checking an electrical connection provided by the conductive loop as connected between pads, and reporting the status of this connection to an interrogator on request. Such an interrogator may, for example, be implemented with a base station type circuit that interrogates tags having such conductive loops as they pass within range.

Various approaches may be implemented for detecting alterations in conductivity characteristics. For example, certain embodiments detect an open or short to determine whether a break in the conductivity loop has occurred. Various embodiments detect resistive characteristics of the conductivity loop, which may indicate some sort of alteration in the loop. Further, aspects described as implemented for tamper detection can also be implemented for detecting circuit damage in a non-tamper type environment (e.g., to detect damage to an identification tag during a manufacturing or shipping process).

Various types of conductive structures are implemented for providing an indication of conductivity related to tampering. Certain embodiments use varied conductive structures such as multiple loops across which conductivity can be collectively measured, or conductive sheets that exhibit changes in conductivity when altered. For example, when a portion of a retail tag is damaged or removed in which the tag includes multiple loops, overall conductivity of the combined loops may change. Such approaches may be useful, for example, to detect various alterations in tags that may occur due to different manners in which the tag may be affixed to a retail good or otherwise implemented. Further, many different tag shapes and sizes can be used in this regard.

Continuity is detected using one or more of a variety of approaches. In some embodiments, a conductor is connected between first and second contact pads, and a voltage is applied to one of the pads while voltage at the other of the pads is detected. In other embodiments, complex signals are communicated along the conductor, such as between the first and second pads as discussed above. When the signal is not received properly (e.g., is altered or not received at all), such characteristics can be implemented as a change in conductivity relating to tampering.

In accordance with another example embodiment, an apparatus includes a communication circuit that communicates wireless signals, and a tamper-detection circuit and a validity-detection circuit, which may be implemented together. The tamper-detection circuit includes a loop conductor having first and second ends and contiguous conductive material extending between the ends, and provides a first output indicative of a connectivity characteristic of the loop conductor. The validity-detection circuit provides a second output indicative of a validity condition corresponding to a power characteristic of the loop conductor that impacts the validity of the first output. In some implementations, the validity-detection circuit includes a power-sensing circuit that senses an amount of power on the loop conductor, and provides the second output indicative of the sensed amount of power. An energy-transfer circuit receives wireless power (e.g., electromagnetic power) and powers the apparatus via the wireless power. The communication circuit communicates the wireless signals by transmitting a signal indicative of the first and second outputs. In some embodiments, the energy-transfer circuit includes an antenna and an inductor that convert an inductive or other radio frequency field received via the antenna to current.

The tamper-detection circuit is connected to at least one of the ends of the loop conductor and provides the first output in a variety of manners. In some embodiments, in response to detecting a high voltage level at the first one of the ends of the loop conductor while the high voltage level is provided at the other one of the ends of the loop conductor, the tamper-detection circuit provides an output indicating that the loop conductor is contiguous, therein indicating that the apparatus has not been tampered with. In response to detecting the low voltage level at the first one of the ends of the loop conductor while the high voltage level is provided at the other one of the ends of the loop conductor, the tamper-detection circuit provides an output indicating that the loop conductor is discontinuous, therein indicating a break in the contiguous conductive material.

In a more particular embodiment, when the second output indicates that the first output is invalid, a reduced power level is provided to the energy-transfer circuit and the tamper-detection circuit provides a third output indicative of a connectivity characteristic of the loop conductor as powered at the reduced power level. The validity-detection circuit is further configured and arranged to provide a fourth output indicative of a validity condition relating to a power characteristic of the loop conductor at the reduced power level. The communication circuit operates with the tamper-detection circuit and the validity-detection circuit to transmit the wireless signals by transmitting a signal indicative of the third and fourth outputs.

The communication circuit operates in a variety of manners. In some embodiments, the communication circuit operates with the tamper-detection circuit and the validity-detection circuit to transmit the wireless signals by transmitting a signal indicative of the first and second outputs by transmitting a signal indicating each of the first and second outputs. In other embodiments, the communication circuit operates with the tamper-detection circuit and the validity-detection circuit to transmit the wireless signals by transmitting a signal indicative of the first and second outputs by transmitting a signal indicative of the first output, in response to the second output indicating that the first output is valid. In still other embodiments, the communication circuit operates with the tamper-detection circuit and the validity-detection circuit to transmit the wireless signals by transmitting a signal indicative of the first and second outputs, by transmitting a signal indicative of the second output, therein communicating an indication that the first output is invalid.

The validity of the first output is characterized in a variety of manners. In some implementations, the validity-detection circuit provides the second output to indicate that the first output is invalid, in response to detecting a power level on the loop conductor that exceeds a defined threshold beyond which the first output is susceptible to error. In certain implementations, the conductive loop is attached to a substrate and operates with the substrate to tear in response to a tearing force exerted upon the substrate, and presents an open circuit between respective ends of the loop in response to the tearing force. In other embodiments, the tamper-detection circuit provides the first output by providing a first bit having a first level in response to the loop conductor having electrical continuity, and provides the first bit having a second level in response to the loop conductor exhibiting electrical discontinuity. The validity-detection circuit provides the second output by providing a second bit having a first level in response to the power characteristic indicating a power overload, and provides the second bit having a second level in response to the power characteristic not indicating a power overload.

In other embodiments, one or more of the above-discussed embodiments further involves an interrogator circuit that generates the wireless power, and receives the signal indicative of the first and second outputs. The interrogator circuit generates an output indicative of tampering characteristics of the loop conductor in response to both the first output indicating a connectivity characteristic corresponding to an alteration of the loop conductor, and the second output indicating that the first output is valid. The interrogator circuit further generates an output indicative of a validity-related error condition in response to the second output indicating that the first output is invalid. In some implementations, the interrogator circuit is responsive to the output indicative of the error condition by generating wireless power at a reduced power, and then receiving another signal indicative of the first and second outputs as re-generated using the generated wireless power from the reduced power. The output indicative of the validity-related error is generated in response to the re-generated second output indicating that the re-generated first output is invalid.

Another embodiment is directed to an apparatus including a loop conductor having first and second ends and contiguous conductive material extending between the ends, a detection circuit, a communication circuit and an energy circuit that receives wireless power and powers the loop conductor, detection circuit, and communication circuit via the wireless power. The detection circuit detects electrical characteristics of the loop conductor, the electrical characteristics being indicative of continuity of the loop conductor and indicative of power provided to the loop conductor, the detected power characteristics being indicative of a validity of the detected continuity characteristics. The communication circuit operates with the detection circuit to communicate a wireless signal indicative of the detected electrical characteristics.

In some embodiments, the apparatus further includes an interrogator circuit that generates the wireless power and transmits the wireless power to the energy circuit, receives the wireless signals, and detects tampering of the loop conductor in response to the wireless signal being indicative of both a discontinuity in the loop conductor and the detected continuity characteristics being valid. In some implementations, the interrogator circuit detects an over-power condition in response to the wireless signal being indicative of the detected continuity characteristics being invalid.

In a more particular embodiment, the interrogator circuit is responsive to the wireless signal being indicative of the detected continuity characteristics being invalid by re-generating the wireless power at a reduced power level, with the energy circuit powering the loop conductor, detection circuit and communication circuit via the wireless power at the reduced power level. The detection circuit detects further electrical characteristics of the loop conductor while the loop conductor is operated via the reduced power, with the further electrical characteristics being indicative of continuity of the loop conductor and indicative of the power provided to the loop conductor. The characteristics that are indicative of power provided to the loop conductor are indicative of a validity of the characteristics indicative of continuity of the loop conductor. The interrogator circuit detects tampering of the loop conductor in response to the wireless signal being indicative of both a discontinuity in the loop conductor and the detected continuity characteristics being valid as the detection circuit is powered via the wireless power at the reduced power level.

Another embodiment is directed to a method for use with a loop conductor having first and second ends and contiguous conductive material extending between the ends. Electrical characteristics of the loop conductor, which are indicative of continuity of the loop conductor and of power provided to the loop conductor, are detected. The detected power characteristics are indicative of a validity of the detected continuity characteristics. A wireless signal indicative of the detected electrical characteristics is communicated. Power is provided to the loop conductor and for the detecting and the communicating, via a received wireless signal.

In some embodiments, the method further includes generating and transmitting the wireless power from an interrogator circuit remote from the loop conductor. The wireless signal is received and tampering of the loop conductor is detected in response to the wireless signal being indicative of both a discontinuity in the loop conductor and the detected continuity characteristics being valid. In some implementations, an overpower condition is detected at the interrogator in response to the wireless signal being indicative of the detected continuity characteristics being invalid.

Turning now to the Figures, FIG. 1 shows an apparatus 100 for detecting tamper or damage characteristics of a circuit, in accordance with an example embodiment. The apparatus includes a tamper-detection device 110 and an interrogator device 120, with some embodiments directed explicitly to the tamper-detection device 110 and/or a specific circuit or combination of circuits therein, and with other embodiments directed to the interrogator device 120 and/or a specific circuit or combination of circuits therein. As such, the apparatus 100 may be implemented wholly as shown or in part.

The tamper-detection device 110 includes an energy-transfer circuit 111 including an antenna-type structure that receives wireless energy, and a power generator 112 that uses the received wireless energy to provide power to circuitry within the tamper-detection device 110 (e.g., by inducing current via a received RF, electromagnetic or inductive field). A tamper-detection circuit 113 is connected to a conductive loop 114 and operates to detect one or more conductivity characteristics of the conductive loop (e.g., an open/short, or other change in conductivity). A validity-detection circuit 115 detects a power-related characteristic of the tamper-detection device 110 as relates to power generated from the received wireless energy via the power generator 112, and is shown by way of example as detecting power on the conductive loop 114. For example, in some embodiments the validity-detection circuit provides an output such as a bit that indicates whether or not detected power on the conductive loop exceeds a threshold beyond which the tamper-detection circuit is susceptible to error. In some embodiments, the tamper-detection circuit 113 and the validity-detection circuit 115 are implemented in a common circuit.

Each of the tamper-detection circuit 113 and validity-detection circuit 115 provide outputs to communication circuit 116 (e.g., that communicates by reflecting/modulating incoming energy, or via a transmitter and antenna), which transmits data to the interrogator device 120 relating to tamper detection. In some embodiments, the communication circuit 116 outputs both an indication of tamper detection and of validity, and the interrogator device 120 uses the latter indication of validity in using the tamper detection indication (e.g., to discard the tamper indication or otherwise note that the tamper indication is possibly erroneous).

In other embodiments, communication circuit 116 selectively outputs the indication of tamper detection based upon a condition of validity as provided via the validity detection circuit, such that the tamper detection indication is not communicated under conditions in which the validity of the indication is in question. In some implementations, the communication circuit 116 communicates the validity indication under conditions in which the output of the tamper-detection circuit 113 is determined to be invalid (e.g., and is not communicated). In certain implementations, the tamper-detection device 110 then re-checks the conductivity characteristic of the conductive loop 114 under reduced power.

The interrogator device 120 includes an energy-transfer circuit 121, a communication circuit 122 and a tamper-evaluation circuit 123. The energy-transfer circuit 121 generates wireless energy that powers remote tamper-detection circuits such as tamper-detection device 110. The communication circuit 122 receives communications from tamper-detection circuits, including such communications as shown providing indications of tamper detection and/or validity. Tamper-evaluation circuit 123 uses information received via the communication circuit 122 to determine whether tamper-detection device 110 has been tampered with.

In some embodiments, the interrogator device 120 is responsive to an indication of an invalid tamper detection by adjusting (e.g., reducing) the amount of power generated and presented to the tamper-detection device 110. Using this adjusted power, the interrogator device 120 powers the tamper-detection device 110, which again carries out the process of detecting that a conductivity characteristic has changed on the conductive loop 114. This process can be repeated until a valid indication of tamper detection is obtained, which is provided and used at the interrogator device 120 to determine whether the tamper-detection device 110 (e.g., or an article to which the device is attached) has been tampered with.

For general information regarding tamper-detection circuits and their implementation, and for specific information regarding methods, systems, circuits that may be implemented with one or more embodiments discussed herein, reference may be made to product data sheets SL3S1203_1213 UCODE G2iL and G2iL+, Rev. 4.3, 27 Nov. 2013, and SL3S1003_1013 UCODE G2iM and G2iM+, Rev. 3.5, 7 Nov. 2013, both from NXP Semiconductors of Eindhoven, The Netherlands, and both of which are fully incorporated herein by reference. For instance, communication circuits, detection circuits and memory circuits as described therein may be implemented in accordance with one or more embodiments, such as with the apparatus(es) shown in FIG. 1.

Figure 2:
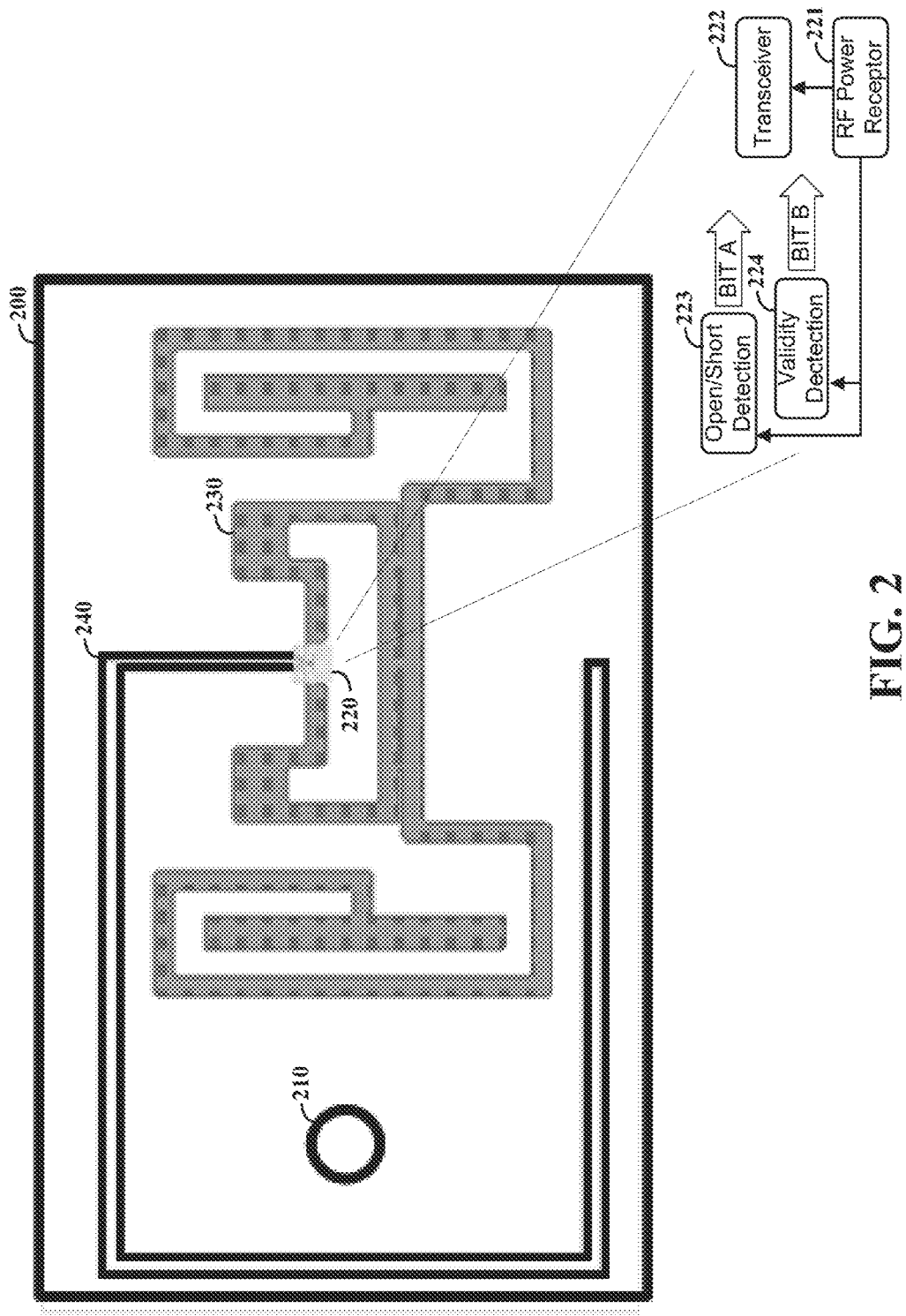
FIG. 2 shows a tag apparatus with a tamper-detection circuit, in accordance with another example embodiment.

FIG. 2 shows a tag apparatus 200 with a tamper-detection circuit, in accordance with another example embodiment. The tag apparatus 200 may, for example, be attached to a retail good such as clothing, via a fastener that passes through opening 210 (e.g., a string or plastic line). Detection circuitry 220 is coupled to an antenna-type structure 230 that receives wireless power, and to a conductive loop 240. The detection circuitry 220 operates using power received via the antenna-type structure 230, and imparts a voltage to the conductive loop 240 via the received power. The detection circuitry 220 detects a conductivity characteristic of the conductive loop 240, such as an open/short, by detecting whether voltage is carried through the conductive loop. The detection circuitry 220 also provides an indication of validity of the detected conductivity characteristic, based upon power provided on the conductive loop 240 and/or otherwise in the tag apparatus 200. For instance, if the tag apparatus 200 is forcibly removed from a fastener coupled through opening 210, the continuity of the conductive loop 240 may be broken. The detection circuitry 220 detects this continuity break and provides an indication of tampering in response thereto. In certain embodiments, the tag apparatus 200 includes a portion of weakened strength extending from the opening 210 that facilitates tearing in response to force, along a line that crosses through the conductive loop 240.

In some implementations, the detection circuitry 220 includes an RF power receptor 221, transceiver 222, open/short detection circuit 223 and validity-detection circuit 224, as shown in the inset. The RF power receptor 221 receives RF power and generates power that operates the detection circuitry 220 and provides power on the conductive loop 240. The open/short detection circuit 223 generates BIT A with a value that indicates whether the conductive loop 240 exhibits an open or short. The validity-detection circuit 224 generates BIT B with a value indicative of whether BIT A is valid, such as may be based upon a detection of a power level on the conductive loop 240 (e.g., consistent with other discussion of validity detection herein). The transceiver 222 transmits BIT A and BIT B to an interrogator, which can use the bits to determine whether the tag apparatus 200 has been tampered with.

Figure 3:
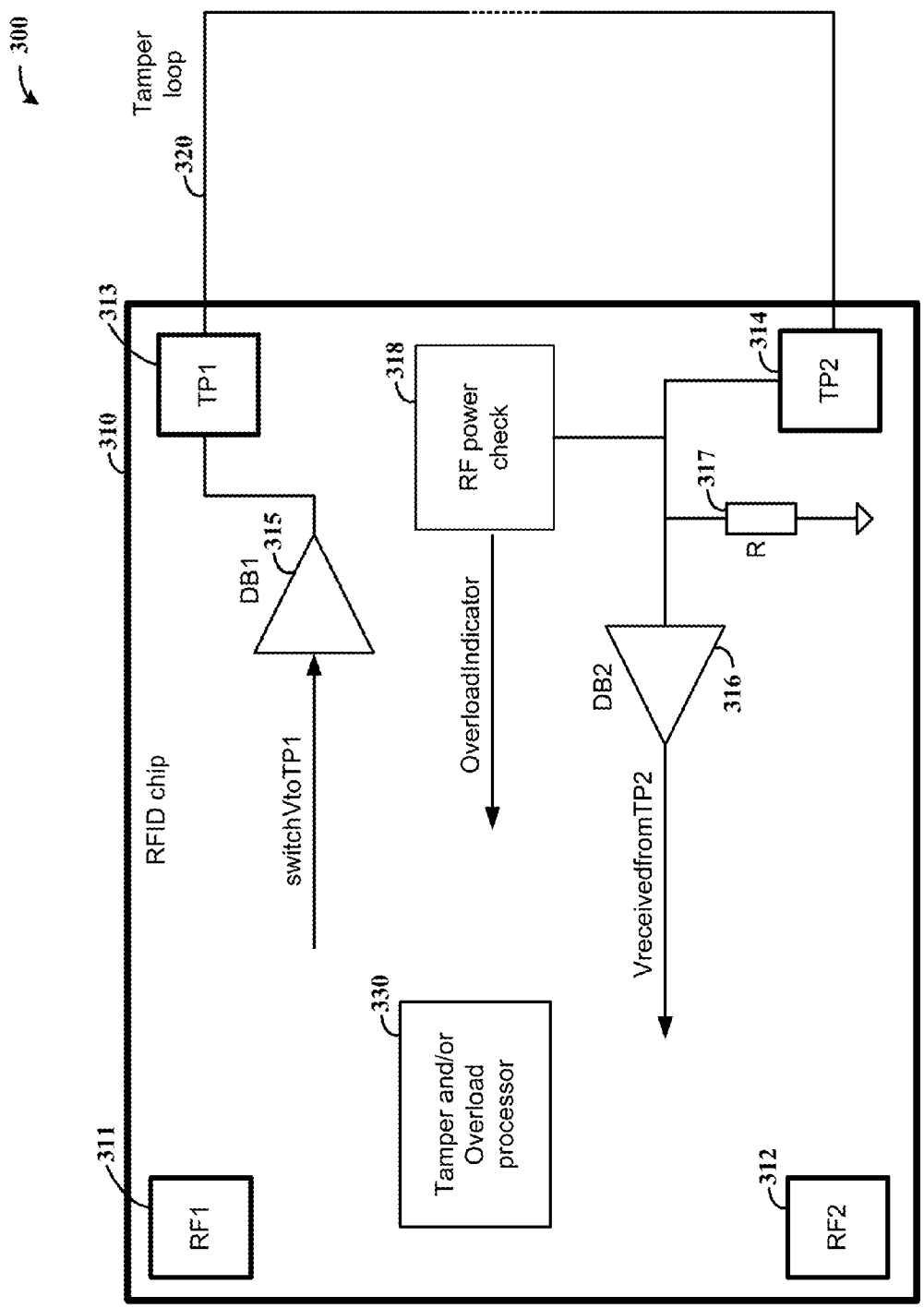
FIG. 3 shows an RFID chip, in accordance with another example embodiment.

FIG. 3 shows an apparatus 300 including an RFID chip 310, in accordance with another example embodiment. The RFID chip 310 includes pads 311 (RF1) and 312 (RF2) that are operable for connecting to and passing signals with an RFID antenna, as well as tamper pads 313 (TP1), and 314 (TP2) that are shown connected to tamper loop 320 by way of example (which may be implemented as part of the apparatus 300). A digital buffer 315 (DB1) is connected to tamper pad 313 and passes a digital signal (switchVtoTP1) thereto, which forces the tamper loop 320 high. Digital buffer 316 (DB2) is connected to tamper pad 314, with a pull-down resistor 317 connected there between, and reads out a digital signal (VreceivedfromTP2) indicative of a voltage on tamper pad 314. As such, the value from digital buffer 316 can be used to provide an indication of conductivity of the tamper loop 320. For example, where the signal switchVtoTP1 is set to "high" and provided to the digital buffer 315, if the signal VreceivedfromTP2 from digital buffer 316 stays "low," the tamper loop 320 is detected as having an open. If the signal VreceivedfromTP2 from digital buffer 316 is "high," the tamper loop 320 is detected as being closed.

An RF power check circuit 318 is coupled to detect a power characteristic of the RFID chip 310, such as power provided though the tamper loop 320 and/or at the pad 314. Detected power characteristics are provided for use in determining a validity characteristic of the signal provided by digital buffer 316. In some embodiments, the RF power check circuit 318 provides an output signal "OverloadIndicator" in response to the detected power meeting and/or exceeding a power threshold corresponding to an overload.

In some implementations, the RFID chip 310 includes a processor 330 that operates with regard to tamper and/or overload detection. The processor 330 uses the output of digital buffer 316 to set a bit indicative the conductivity characteristic of the tamper loop 320 (and therein of tamper detection), such as by setting a bit to "1" or "0" based upon the signal from the digital buffer 316. This bit is then communicated via the pads 311 and 312. Similarly, the processor 330 may use the output of the RF power check circuit 318 to provide an indication of validity of the signal indicative of tamper detection. In some implementations, the processor 330 sets another bit indicative of the validity signal "OverloadIndicator," and in other implementations selectively communicates the bit indicative of tamper detection based upon the validity thereof (i.e., by not communicating the bit indicative of tamper detection when the detection is invalid).

In another embodiment, the RFID chip 310 operates to detect an overload condition based on the output from the digital buffer 316. For instance, if the output "VreceivedfromTP2" is greater than the input "switchVtoTP1," this can be used as an indication of an overload condition. Such an approach may be implemented, for example, where the output from digital buffer 316 is a logical "1" indicating a high voltage condition, where the input to digital buffer 315 is a logical "0" indicating a low voltage condition.

Figure 4:
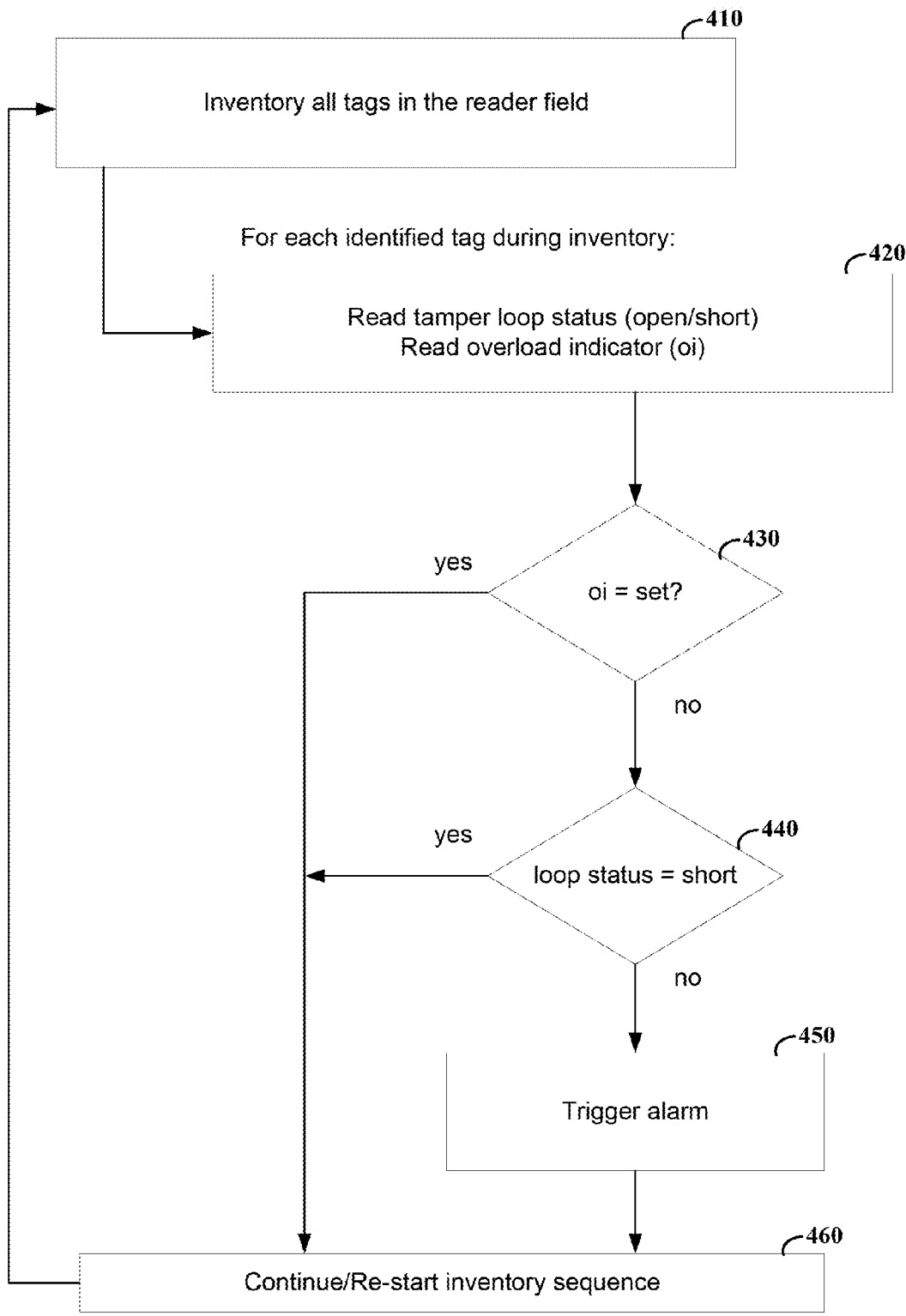
FIG. 4 shows a flow diagram for tamper detection, in accordance with another example embodiment.

FIG. 4 shows a flow diagram for tamper detection, in accordance with another example embodiment. At block 410, an interrogator inventories all tags in a particular reader field that the interrogator operates for communicating in, such as by making an inventory of all tags within a bag of retail goods or otherwise carried by a customer. At block 420, for each inventoried tag, the tamper loop status is read from the tag along with an overload indicator that is indicative of a power overload on the tag. Such an approach may, for example, involve wirelessly powering each tag and receiving, from each tag, respective bits indicative of the tamper loop status and potential overload.

The information received from each tag is processed as follows. If the overload indicator is set at block 430, the tamper loop status can be discarded or ignored and the process continues and/or is re-started at block 460, returning to block 410. If the overload indicator is not set at block 430, and if the loop status is of a short (closed) at block 440, the process also continues and/or is re-started at block 460, returning to block 410 (e.g., the tag(s) are detected as not being tampered with). However, if the loop status is not of a short at block 440 (e.g., is of an open, or a conductivity that is not indicative of a short), an alarm is triggered at block 450 to indicate a tamper condition relative to the loop of one of the inventoried tags.

Various blocks, modules or other circuits may be implemented to carry out one or more of the operations and activities described herein and/or shown in the figures. In these contexts, a "block" (also sometimes "logic circuitry" or "module") is a circuit that carries out one or more of these or related operations/activities (e.g., tamper detection, validation, or communications). For example, in certain of the above-discussed embodiments, one or more modules are discrete logic circuits or programmable logic circuits configured and arranged for implementing these operations/activities, as in the circuit modules shown in FIGS. 1, 2 and 3. In certain embodiments, such a programmable circuit is one or more computer circuits programmed to execute a set (or sets) of instructions (and/or configuration data). The instructions (and/or configuration data) can be in the form of firmware or software stored in and accessible from a memory (circuit). As an example, first and second modules include a combination of a CPU hardware-based circuit and a set of instructions in the form of firmware, where the first module includes a first CPU hardware circuit with one set of instructions and the second module includes a second CPU hardware circuit with another set of instructions.

Certain embodiments are directed to a computer program product (e.g., nonvolatile memory device), which includes a machine or computer-readable medium having stored thereon instructions which may be executed by a computer (or other electronic device) to perform these operations/activities.

Based upon the above discussion and illustrations, those skilled in the art will readily recognize that various modifications and changes may be made to the present invention without strictly following the exemplary embodiments and applications illustrated and described herein. For example, different types of signals can be used for communicating data and/or power between respective components, and various circuits may be combined (e.g., tamper detection and validation). Such modifications do not depart from the true spirit and scope of the present invention, including that set forth in the following claims.

What is claimed is:

1. An apparatus comprising:
a communication circuit configured and arranged to communicate wireless signals;
an energy-transfer circuit, including an antenna, configured and arranged to receive wireless power and to power the apparatus via the received wireless power by converting an inductive field received via the antenna to current;
a tamper-detection circuit including a loop conductor having first and second ends and contiguous conductive material extending between the first and second ends, the tamper-detection circuit being coupled to at least one end of the first and second ends of the loop conductor and being configured and arranged to provide a first output indicative of a connectivity characteristic of the loop conductor; and
a validity-detection circuit configured and arranged to provide a second output indicative of a power overload condition and a validity condition corresponding to a power characteristic of power provided to the loop conductor that impacts a validity condition of the first output in response to the power characteristic of power provided to the loop conductor crossing a defined threshold beyond which the first output is susceptible to error,
the communication circuit being configured and arranged with the tamper-detection circuit and the validity-detection circuit to transmit the wireless signals by transmitting a signal indicative of the first and second outputs, therein communicating an indication that the first output is valid or invalid, wherein the first output is invalid responsive to the power characteristic of power provided to the loop conductor being outside the defined threshold.

2. The apparatus of claim 1, wherein the tamper-detection circuit is configured and arranged to provide the first output by:
in response to detecting a high voltage level at the first end of the loop conductor while the high voltage level is provided at the second end of the loop conductor, providing an output indicating that the loop conductor is contiguous, therein indicating that the apparatus has not been tampered with, and
in response to detecting a low voltage level at the first end of the loop conductor while the high voltage level is provided at the second end of the loop conductor, providing an output indicating that the loop conductor is discontinuous, therein indicating a break in the contiguous conductive material; and wherein
the validity-detection circuit includes a power-sensing circuit configured and arranged to sense an amount of power on the loop conductor, and to provide the second output based on the sensed amount of power.

3. The apparatus of claim 1, wherein in response to the second output indicating that the first output is invalid and to the energy-transfer circuit receiving radio frequency (RF) power at a reduced power level:
the tamper-detection circuit is configured and arranged to provide a third output indicative of a connectivity characteristic of the loop conductor as powered at the reduced power level;
the validity-detection circuit is configured and arranged to provide a fourth output, to the communication circuit, indicative of a validity condition relating to a power characteristic of the loop conductor at the reduced power level; and
the communication circuit is configured and arranged with the tamper-detection circuit and the validity-detection circuit to transmit the wireless signals by transmitting a signal indicative of the third and fourth outputs.

4. The apparatus of claim 1, wherein the communication circuit is configured and arranged with the tamper-detection circuit and the validity-detection circuit to transmit the wireless signals by transmitting the signal indicative of the first and second outputs by transmitting a signal indicating each of the first and second outputs, wherein the second output is indicative of the power overload condition and wherein the tamper-detection circuit is configured and arranged to indicate whether the apparatus has been tampered with in response to detecting a change in voltage level at the loop conductor.

5. The apparatus of claim 1, wherein the communication circuit is configured and arranged with the tamper-detection circuit and the validity-detection circuit to transmit the wireless signals by transmitting the signal indicative of the first and second outputs by transmitting a signal indicative of the first output, in response to the second output indicating that the first output is valid, wherein the second output is indicative of whether a level of the received wireless power as provided on the loop conductor exceeds the defined threshold, the defined threshold being indicative of the power overload condition.

6. The apparatus of claim 1, wherein the communication circuit is configured and arranged with the tamper-detection circuit and the validity-detection circuit to transmit the wireless signals by transmitting the signal indicative of the first and second outputs by transmitting a signal indicative of the second output, therein communicating an indication that the first output is invalid.

7. The apparatus of claim 1, wherein the tamper-detection circuit and the validity-detection circuit are a common circuit; and
wherein the power characteristic includes a voltage level provided to the loop conductor and the tamper-detection circuit is configured and arranged to, responsive to the second output indicating that the first output is invalid, provide a third output indicative of a conductivity characteristic of the loop conductor under an adjusted power, wherein the adjusted power includes a reduction from an amount of power provided to the tamper-detection circuit.

8. The apparatus of claim 1, wherein the power characteristic includes a voltage level provided to the loop conductor and wherein the validity-detection circuit is configured and arranged to provide the second output indicative of the validity condition based upon a voltage level induced between the first and second ends of the loop conductor.

9. The apparatus of claim 1, wherein the validity-detection circuit is configured and arranged to provide the second output to indicate the first output is invalid in response to detecting a power level on the loop conductor that exceeds the defined threshold beyond which the first output is susceptible to error.

10. The apparatus of claim 1, wherein the loop conductor is attached to a substrate and configured and arranged with the substrate to tear in response to a tearing force exerted upon the substrate, and to present an open circuit between the first and second ends of the loop in response to the tearing force.

11. The apparatus of claim 1, further including an interrogator circuit configured and arranged to:
generate the wireless power;
receive the signal indicative of the first and second outputs;
generate an output indicative of tampering characteristics of the loop conductor in response to the first output indicating a connectivity characteristic corresponding to an alteration of the loop conductor; and the second output indicating that the first output is valid; and
generate an output indicative of a validity-related error condition in response to the second output indicating that the first output is invalid.

12. The apparatus of claim 11, wherein
the interrogator circuit is responsive to the output indicative of the validity-related error condition by generating the wireless power at a reduced power, and wherein the interrogator circuit is further configured to receive another signal indicative of the first and second outputs as re-generated using the generated wireless power at the reduced power, and
in response to the re-generated second output indicating that the re-generated first output is valid, generating an output indicative of an absence of the validity-related error condition, and
in response to the re-generated second output indicating that the re-generated first output is again invalid, generating another output indicating that the first output is invalid.

13. An apparatus comprising:
a communication circuit configured and arranged to communicate wireless signals;
an energy-transfer circuit, including an antenna, configured and arranged to receive wireless power and to power the apparatus via the received wireless power by converting an inductive field received via the antenna to current;
a tamper-detection circuit including a loop conductor having first and second ends and contiguous conductive material extending between the first and second ends, the tamper-detection circuit being coupled to at least one end of the first and second ends of the loop conductor and being configured and arranged to provide a first output indicative of a connectivity characteristic of the loop conductor; and
a validity-detection circuit configured and arranged to provide a second output indicative of a validity condition corresponding to a power characteristic of power provided to the loop conductor that impacts a validity of the first output,
the communication circuit being configured and arranged with the tamper-detection circuit and the validity-detection circuit to transmit the wireless signals by transmitting a signal indicative of the first and second outputs, therein communicating an indication that the first output is valid or invalid, wherein the first output is invalid responsive to the power characteristic of power provided to the loop conductor being outside a defined threshold, and wherein the tamper-detection circuit is configured and arranged to provide the first output by providing a first bit having a first level of said first bit in response to the loop conductor having electrical continuity, and by providing the first bit having a second level of said first bit in response to the loop conductor exhibiting electrical discontinuity, and
the validity-detection circuit is configured and arranged to provide the second output by providing a second bit having a first level of said second bit in response to the power characteristic indicating a power overload, and by providing the second bit having a second level of said second bit in response to the power characteristic not indicating the power overload.

14. An apparatus comprising:
a loop conductor having first and second ends and contiguous conductive material extending between the first and second ends;
a detection circuit being coupled to at least one end of the first and second ends of the loop conductor and configured and arranged to detect electrical characteristics of the loop conductor, the detected electrical characteristics being indicative of continuity of the loop conductor and indicative of power provided to the loop conductor, the detected electrical characteristics indicative of the power provided to the loop conductor being indicative of a validity of the detected electrical characteristics indicative of the continuity of the loop conductor, the detection circuit configured and arranged to indicate a valid power overload condition corresponding to the detected electrical characteristics crossing a defined threshold beyond which a connectivity output, which is indicative of a connectivity characteristic of the loop conductor, is susceptible to error;
a communication circuit configured and arranged with the detection circuit to communicate a wireless signal indicative of the detected electrical characteristics, therein communicating an indication that the detected electrical characteristics indicative of the continuity of the loop conductor are valid or invalid, wherein the detected electrical characteristics indicative of the continuity of the loop conductor are invalid responsive to the detected electrical characteristics indicative of the power provided to the loop conductor being outside the defined threshold; and
an energy circuit, including an antenna, configured and arranged to receive wireless power and to power the loop conductor, the detection circuit, and the communication circuit via the received wireless power by converting an inductive field received via the antenna to current.

15. The apparatus of claim 14, further including an interrogator circuit configured and arranged to:
generate the wireless power and transmit the wireless power to the energy circuit;
receive the wireless signals; and
detect tampering of the loop conductor in response to the wireless signal being indicative of both a discontinuity in the loop conductor and the detected electrical characteristics indicative of the continuity of the loop conductor being valid based on the detected electrical characteristics indicative of the power provided to the loop conductor being less than the defined threshold.

16. The apparatus of claim 15, wherein the interrogator circuit is configured and arranged to detect the valid power overload condition in response to the wireless signal being indicative of the detected electrical characteristics indicative of the power provided to the loop conductor exceeding or meeting the defined threshold and the detected electrical characteristics being indicative of continuity being invalid.

17. The apparatus of claim 15, wherein the interrogator circuit is configured and arranged to, in response to the wireless signal being indicative of the detected electrical characteristics indicative of continuity of the loop conductor being invalid, re-generate the wireless power at a reduced power level, the energy circuit being configured and arranged to power the loop conductor, the detection circuit, and the communication circuit via the re-generated wireless power at the reduced power level;
the detection circuit is configured and arranged to detect further electrical characteristics of the loop conductor while the loop conductor is operated at the reduced power level, the detected further electrical characteristics being indicative of the continuity of the loop conductor and indicative of the power provided to the loop conductor, the detected further electrical characteristics indicative of the power provided to the loop conductor being indicative of a validity of the detected further electrical characteristics indicative of the continuity of the loop conductor; and
the interrogator circuit being further configured and arranged to detect tampering of the loop conductor in response to the wireless signal being indicative of both a discontinuity in the loop conductor and the detected further electrical characteristics indicative of the continuity of the loop conductor being valid as the detection circuit is powered via the re-generated wireless power at the reduced power level.

18. A method for use with a loop conductor having first and second ends and contiguous conductive material extending between the first and second ends, the method comprising:
detecting electrical characteristics of the loop conductor, the detected electrical characteristics being indicative of continuity of the loop conductor and indicative of power provided to the loop conductor and of a power overload condition, the detected electrical characteristics indicative of the power provided to the loop conductor being indicative of a validity of the detected electrical characteristics indicative of the continuity of the loop conductor,
determining whether the power overload condition has occurred by assessing whether the detected electrical characteristics are beyond a defined threshold which indicates that a connectivity output, which is indicative of a connectivity characteristic of the loop conductor, is susceptible to error;
communicating a wireless signal indicative of the detected electrical characteristics, therein communicating an indication that the detected electrical characteristics indicative of the continuity of the loop conductor are valid or invalid, wherein the detected electrical characteristics indicative of the continuity of the loop conductor are invalid responsive to the detected electrical characteristics indicative of power provided to the loop conductor being outside the defined threshold; and
using received wireless power, providing power to the loop conductor, and for the detecting, and for the communicating, by converting an inductive field received via an antenna to current.

19. The method of claim 18, further including, at an interrogator circuit remote from the loop conductor:
generating and transmitting the wireless power;
receiving the wireless signals; and
detecting tampering of the loop conductor in response to the wireless signal being indicative of both a discontinuity in the loop conductor and the detected electrical characteristics indicative of the continuity of the loop conductor being valid,
wherein a change in a detected voltage level at the loop conductor is detected to indicate whether the loop conductor has been tampered with and wherein the discontinuity in the loop conductor is validated by comparing the detected electrical characteristics indicative of the power provided to the loop conductor to the defined threshold.

20. The method of claim 19, further including, at the interrogator circuit:
detecting the power overload condition in response to the wireless signal being indicative of the detected electrical characteristics indicative of the continuity of the loop conductor being invalid;
adjusting, by the interrogator circuit, a supplied voltage level provided to the loop conductor; and
re-detecting the electrical characteristics of the loop conductor under the adjusted supplied voltage level.

* * * * *